Figure 1:
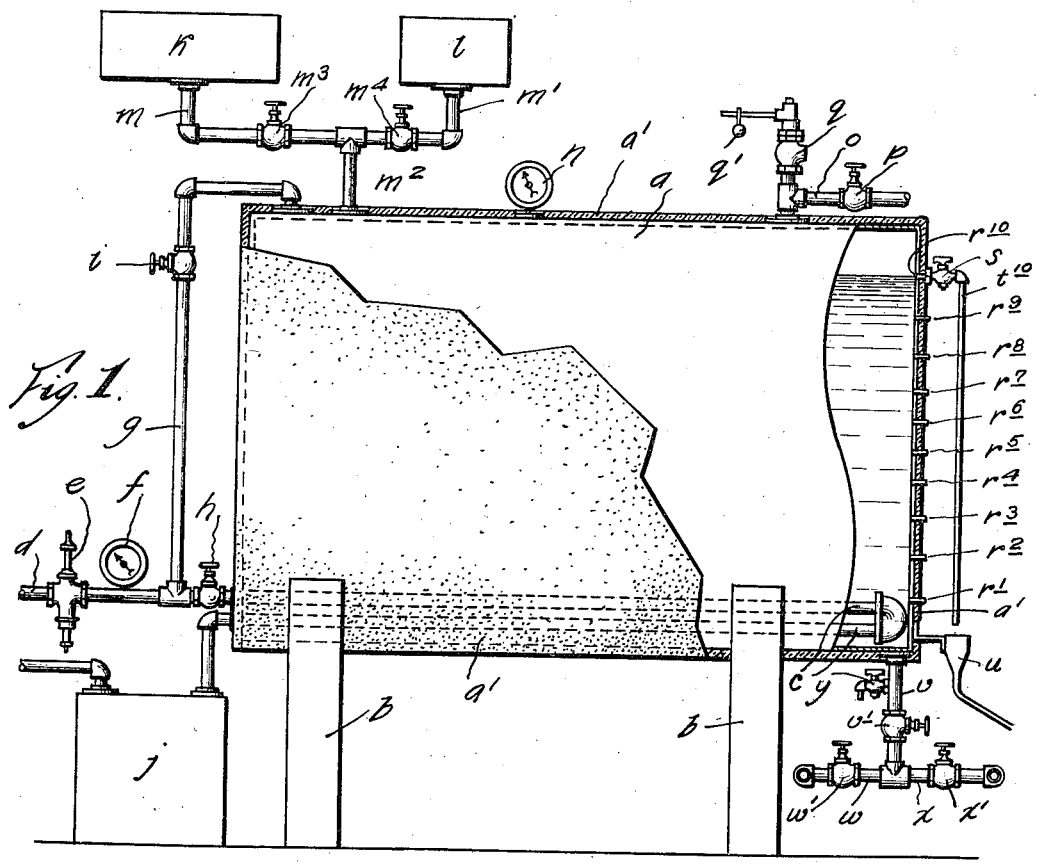

Aug. 13, 1929.    R. R. RIPLEY ET AL    1,724,222
PROCESS FOR THE RECOVERY OF GAS TARS FROM THEIR EMULSIONS WITH WATER
Filed April 22, 1924

Inventor
Sigmund C. Schwarz
Russell R. Ripley

Attorney

Patented Aug. 13, 1929.

1,724,222

UNITED STATES PATENT OFFICE.

RUSSELL R. RIPLEY AND SIGMUND C. SCHWARZ, OF PORTLAND, OREGON.

PROCESS FOR THE RECOVERY OF GAS TARS FROM THEIR EMULSIONS WITH WATER.

Application filed April 22, 1924. Serial No. 708,190.

The particular object of our invention is to recover in the form of a salable tar—one of the principal uses of which is as a binder in road building,—the heavy viscous hydro-carbon emulsions with water which are by-products in the manufacture of city gas from crude petroleum, fuel or gas oil.

Furthermore to provide a process which is especially adapted to deal with oil-gas, and water-gas tar emulsions that contain a high percentage of solid matter.

And a still further object is to effect said recovery at a cost fully covered by the value of the products recovered, so that the practice of said process is commercially feasible.

The water content of these emulsions is relatively high, usually between 30% and 85%, and these emulsions have been very difficult to dehydrate economically. For that reason they are generally considered waste and of no commercial value; indeed were considered an unavoidable evil in the said processes.

The distillation of the water from these emulsions is impractical, because of the cost of the relatively great amount of heat necessary to evaporate the large percentage of water. Furthermore, the distilling off of the water would carry with it some of the more volatile hydro-carbons, thus changing the inherent properties of the original hydro-carbon mixture in the emulsion. The use of centrifugal and other mechanical devices presents annoying features, in that the emulsion frequently holds a large percentage of free carbon in suspension; and this tends to clog the mechanical devices and thus interrupt the work.

Prior to our invention, it was known that certain chemicals when mixed with said emulsions have the property of inducing coalescence, and thus promoting the separation of the water and the hyro-carbons. But when dealing with an emulsion containing heavy viscous hydro-carbons, such as is the by-product in the process of making oil-gas, the mere use of a demulsifying agent such as caustic soda was not found commercially practical because the amount of water separation that could be so brought about was relatively small.

It was also known that the heating of a hydro-carbon liquid would cause it to flow more freely. Thus hydro-carbon emulsions containing a high percentage of free carbon and heavy tars, or oils, will separate more readily at a high temperature than a low temperature. But when dealing with heavy viscous hydro-carbon emulsions, the use of heat alone was found not to be commercially practical because the emulsion had to be heated to a very high temperature; hence; to prevent vaporization, the pressure had to be correspondingly increased, and the increased pressure ncessitated such heavy and expensive apparatus that the cost of operation was much greater than with the method of this invention now being described. Also, the results obtained from high temperature treatment alone—without a demulsifying agent—were not consistent, in that separation of the hydro-carbons and water would not always take place to the same extent. Moreover, the higher pressures were more dangerous, because of the greater possibility of the apparatus giving way.

It was found by experience and by experimentation that the recovery of heavy viscous hydro-carbons from oil-gas-tar emulsions is extremely difficult, and heretofore has not been commercially practicable. All former methods known to applicants changed the nature of the hydro-carbons, by destroying the properties of part of the constituents, removed only a small percentage of water, or were so costly to operate that they have not found favor in commercial practice.

A demulsifying agent such as an alkaline base, soluble in water, will tend to break down the emulsion and by raising the temperature of the emulsion, and the pressure, the action of the demulsifying agent is greatly augmented by causing an interaction between sulphonated and possibly other similar hydrocarbons in the tar to form water soluble salts or soaps which cause a lowering of the interfacial tension between tar and water; besides in that way the viscosity of the hydrocarbon is reduced, permitting the constituents of the emulsion to move freely and facilitating the coalescence of the water particles thereof.

Further the inherent binder properties of the tar hydro-carbons are to be retained, so that the hydro-carbons may be used commercially, as mentioned, and in consequence it is not a mere matter of raising the temperatures and pressure, but these must be adjusted and controlled so that the said inherent properties will not be destroyed. And to do this is the direct purpose of our invention.

We will now explain the steps of our process. The heavy viscous emulsion is introduced into a suitable tank having a vent controlled by a valve, and is intermixed with a suitable proportion of demulsifying agent such as sodium hyroxide or other soluble alkaline base, preferably in solution either before, at the same time, or after the emulsion is introduced into the tank.

Sodium hydroxide is found to be the most economical demulsifier due to its low cost.

The quantity of this chemical which we found gives satisfactory results in our process is approximately one quarter pound to a fifty-gallon barrel of emulsion, or six-hundredths of one per cent by weight of the former to the latter. For a few very obstinate emulsions slightly more sodium hydroxide may be required.

Heat is then applied to the tank, with its vent open, to bring the commixture to a violent boil manifested by steam issuing from the vent, thereby to reduce the viscosity of the commixture and also to set up convection currents in the emulsion, and thus further promote the complete intermixture of its ingredients. After the commixture has been thoroughly agitated the valve of said vent is closed, and by continued heating, the temperature is raised to a point of approximately three hundred and twenty degrees Fahrenheit under a gage pressure of approximately seventy-five pounds, thus below a point at which the hydro-carbons present would be materially altered by cracking. The temperature and pressure is then maintained for a period until the interaction of caustic soda with sulphonated and similar hydrocarbons is complete and the desired coalescence of the water particles is manifested in samples taken from the tank.

We have found by experience that some of the emulsions of this type will begin coalescence of the water particles before the maximum temperature of 320 degrees Fahrenheit and seventy-five pounds of gage pressure are reached. After the prescribed maximum temperature and pressure have been reached, and the water particles have begun to separate, then a settling period of substantial quiescence must be induced by discontinuing the heating and gradually reducing the pressure to atmospheric, and this quiescence must be maintained until the water and the tar have separated into distinct strata. A settling period of from twelve to thirty-six hours has been found to cause a separation of the more stubborn emulsions.

Our process is commercially practicable because of the economy and ease of operation, and the recovery of the tars in such condition as to be well adapted for their chief commercial use, namely as binders in the construction of tar bound macadam roads.

Figure 2:
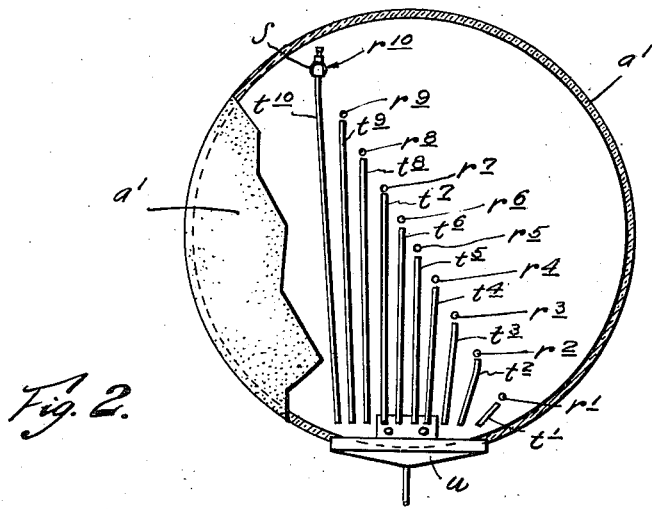

In carrying our invention into practice, we find it convenient to use an apparatus such as illustrated in the accompanying drawings, in which:

Fig. 1 is a diagrammatic side elevation of the apparatus with parts broken away to show details of construction; and Fig. 2 is a diagrammatic end view of the same.

We consider the mechanism shown as preferable for use with our process because it permits the chemicals to be more evenly distributed throughout the emulsion while the container is being charged, and permits the apparatus to be operated with the minimum amount of attention and expense.

The emulsion is contained in a tank $k$ and the demulsifying solution in a tank designated as tank $l$. We provide a pipe $m$ from tank $k$ as an outlet for the emulsion and a pipe $m'$ from the tank $l$ as an outlet for the demulsifying solution. These two pipes are preferably connected to a common inlet pipe $m^2$ so that these two ingredients can be run or pumped into the container $a$ simultaneously, thus thoroughly intermixing one with the other. We provide manually operated control valves in each of the pipes $m$ and $m'$, the valves being marked $m^3$ and $m^4$. The valve $m^3$ controls the passage of the liquid through the pipe $m$ and the valve $m^4$ controls the passage of the liquid through the pipe $m'$.

The container $a$ preferably a horizontally arranged cylindrical boiler of 5000 gallons capacity, more or less, which is constructed so as to be capable of withstanding safely 75 pounds gage pressure. This container is spaced from the floor and mounted on supports $b$. The bottom of the container is provided with steam coils $c$, preferably near the bottom, and the steam is supplied to these coils through a supply pipe $d$. Said supply pipe is provided with a steam gage $f$, and a pressure regulator $e$, which is provided because steam is usually transmitted at a gage pressure greater than 75 pounds. Connecting with the supply pipe $d$ is a branch $g$ which leads into the top of the container. The branch supplying the steam coil $c$ is controlled by a manually operated valve $h$ and the branch $g$ is controlled by a manually operated valve $i$. We provide a steam trap $j$ in the return end of the pipe leading from the steam coil $c$ so as to remove the condensed steam.

The top of the container is provided with a pressure gage $n$ to indicate the pressure within the container, and with a vent pipe $o$ controlled by a valve $p$. We preferably provide a safety valve $q$ which is connected to the pipe $o$ ahead of the manually operated valve $p$, and may be set to any desired pressure by means of the adjustable weight $q'$.

At one end of the container, preferably at the end away from the source of supply, we provide a number of test outlets $r'$ to $r^{10}$ inclusive, and we control these outlets by test cocks $s$.

We have shown merely one of these test cocks, but it is to be understood that there is one test cock for each of said outlets $r'$ to $r^{10}$ inclusive, which are spaced one above the other so that they will fall upon lines indicating tenths of the volume of the emulsion in the container, thus, if the emulsion runs out of the test outlet $r^9$ it will indicate that the container is nine-tenths full. Each of these test cocks is preferably provided with discharge pipe $t'$ to $t^{10}$ inclusive, and these discharge pipes lead to a common drain $u$. Above the test outlet $r^{10}$ we leave a space of approximately 15% of the total volume of the container.

For drawing off the tar after the completion of the settling period, we provide a drainpipe $v$ which leads to two diverging pipes $w$ and $x$, and the valves $w'$ and $x'$.

The operation of our apparatus in carrying out our process is as follows:

The emulsion is run from the tank $k$ through pipes $m$ and $m^2$ into the container $a$ with the valve $p$ of the vent $o$ open. Simultaneously, the demulsifying solution is run from tank $l$ through pipe $m'$ into pipe $m^2$, where the solution mixes with the emulsion before entering the container. The quantity of demulsifying solution added to the emulsion is regulated as desired by simply changing the rate of flow of either liquid in pipes $m$ or $m'$, or by changing the concentration of the chemical solution.

The rise in level of the emulsion while charging the container $a$ can be watched by opening the test cocks on the test outlets $r'$ to $r^{10}$ inclusive. When the container is filled to desired depth, the supply of emulsion and chemical is shut off by closing valves $m^3$ and $m^4$.

The emulsion is then heated by admitting steam to the coils $c$ by opening the valve $h$ the valve $o$ being left open. The heating surface of the coils and the rate of flow of the steam preferably should be such as to bring the heat of the emulsion to the boiling point, with vent pipe $o$ open, in less than two hours. The more rapid the heating, the greater will be the agitation and mixing of demulsifying solution with emulsion, and as a result, the more rapid and better will be the recovery of the tar. The rapid heating method is preferred to mechanical stirring because it is simpler and requires no additional equipment.

When the temperature of the emulsion reaches the boiling point and a steady flow of steam begins to issue from the vent pipe $o$, the vent valve $p$ is closed and the heating continued to accumulate pressure within the container.

The pressure to which the emulsion is subjected depends upon the nature thereof. The simplest method for determining the best operating condition for an emulsion is as follows: While the emulsion is being heated and the pressure in the container increases, observe from time to time the condition of the emulsion at various levels in the container by drawing samples from test outlets $r'$ and $r^{10}$. The heating however must be limited to a maximum of approximately 320 degrees F. and a gauge pressure of 75 pounds.

Practise has indicated that pressures as low as twenty-five pounds gage pressure were satisfactory in some cases to cause the necessary separation of water, but in most cases, pressures of from 25 to 75 pounds gage pressure were required. Heavy emulsions usually require a heat-maintaining period because they do not separate as readily. Therefore, it is advisable to maintain a constant pressure while continuing heating, until separation has well started. With well insulated containers, which are able to hold their pressure for a period of twenty-four hours with a drop of less than twenty-pounds when steam is shut off, additional heat or pressure maintaining may be found unnecessary. For this reason, heat insulation $a'$ is greatly preferred because of its greater economy in heat consumption.

The emulsions which usually require the higher pressures and heat maintaining periods are those with a specific gravity higher than 1.10. The tar from these emulsions usually contains over 10 per cent free carbon, and at ordinary temperatures are practically non-fluid. However, no hard and fast line of distinction can be drawn between the obstinate and less obstinate emulsions.

A settling period as long as 24 hours or more may be required, depending upon the type of apparatus used and the nature of the emulsion treated. A stratum of water will gradually form and increase in volume as the separation continues. There will also appear distinct strata of unseparated emulsion and tar. The lines of demarcation of these strata is determined by means of the test cocks $s$ and further will indicate the approximate degree of separation at any time, knowing the water content of the original emulsion being treated.

We claim:

1. In the process for the recovery of tars from their aqueous emulsions, the steps which consist in adding to the emulsion a relatively small proportion of a demulsifying agent, rapidly heating the mixture to boiling under atmospheric pressure thereby to reduce the viscosity of the commixture and promote the intimate intermixture of its ingredients, then continuing the heating to a higher temperature under increasing pressure, thus not permitting vaporization, and below a point at which the tar would be materially altered by cracking, thereby to induce the coalescence of water particles, then holding the latter temperature until coalescence of the particles manifests itself, and finally discontinuing the heating and gradually relieving said pressure, whereby to induce quiescence to permit an undisturbed separation of the tar by gravity into a distinct stratum facilitating its withdrawal.

2. In the process for the recovery of tars from their aqueous emulsions, the steps which consist in adding to the emulsion a relatively small proportion of a demulsifying solution, rapidly heating the mixture to boiling under atmospheric pressure thereby to reduce the viscosity of the commixture and promote the intimate intermixture of its ingredients, then continuing the heating to a higher temperature under increasing pressure, thus not permitting vaporization, and below a point at which the tar would be materially altered by cracking, thereby to induce the coalescence of water particles, then holding the latter temperature until coalescence of the particles manifests itself, and finally discontinuing the heating, and gradually relieving said pressure, whereby to induce quiescence to permit an undisturbed separation of the tar by gravity into a distinct stratum facilitating its withdrawal.

3. In the process for the recovery of tars from their aqueous emulsions, the steps which consist in adding to the emulsion a relatively small proportion of a demulsifying agent, rapidly heating the mixture to boiling under atmospheric pressure thereby to reduce the viscosity of the commixture and promote the intimate intermixture of its ingredients, then continuing the heating to a higher temperature, not exceeding approximately 320 degree Fahrenheit, under increasing pressure, thus not permitting vaporization, thereby to induce the coalescence of water particles then holding the latter temperature and until coalescence of the particles manifests itself, and finally discontinuing the heating, and gradually relieving said pressure, whereby to induce quiescence to permit an undisturbed separation of the tar by gravity into a distinct stratum facilitating its withdrawal.

RUSSELL R. RIPLEY.
SIGMUND C. SCHWARZ.